United States Patent [19]

Youden et al.

[11] 3,844,186
[45] Oct. 29, 1974

[54] MACHINE TOOL
[75] Inventors: David H. Youden, Reston, Va.;
Arthur F. St. Andre, Marlboro, Mass.
[73] Assignee: Cincinnati Milacron-Heald Corp., Worcester, Mass.
[22] Filed: Dec. 7, 1972
[21] Appl. No.: 312,852

[52] U.S. Cl............. 82/2 R, 82/2 D, 82/30, 308/5
[51] Int. Cl............................................. B23b 3/20
[58] Field of Search ............ 82/2 D, 30; 308/5

[56] References Cited
UNITED STATES PATENTS
3,137,207  6/1964  Berthiez................................ 82/2 D
3,187,609  6/1965  Stephan................................. 82/2 D
3,260,162  7/1966  Atherton............................... 82/30 X
3,533,316  10/1970  Porath.................................. 82/30 X
3,603,652  9/1971  Youden................................. 82/30 X Primary Examiner—Leonidas Vlachos
Attorney, Agent, or Firm—Norman S. Blodgett; Gerry A. Blodgett

[57] ABSTRACT

A machine tool having a guide with hydrostatic bearings arranged so that, when force is applied, it responds with a greater force.

10 Claims, 7 Drawing Figures

PATENTED OCT 29 1974 3,844,186
SHEET 1 OF 3

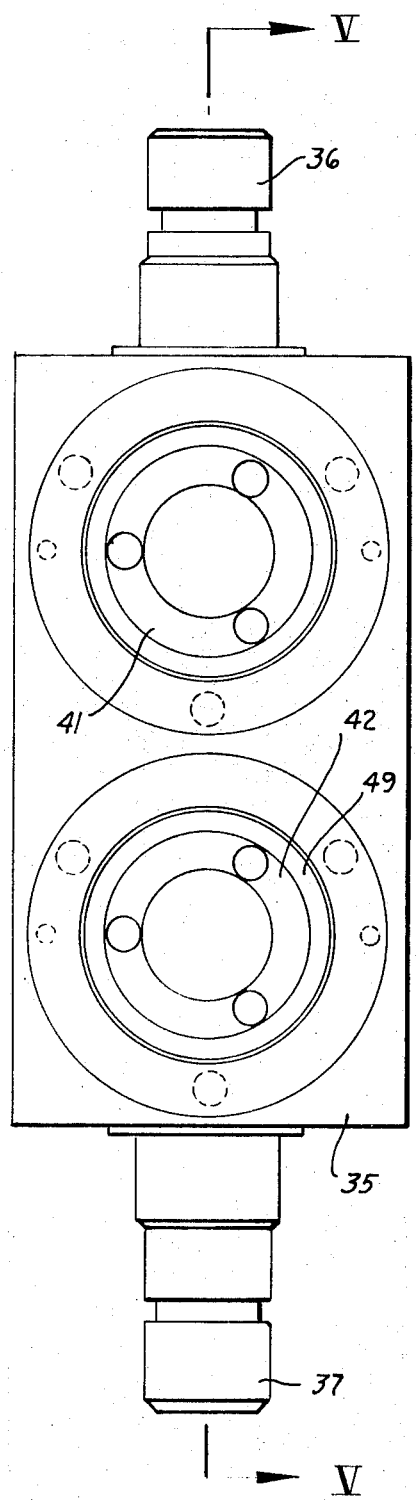
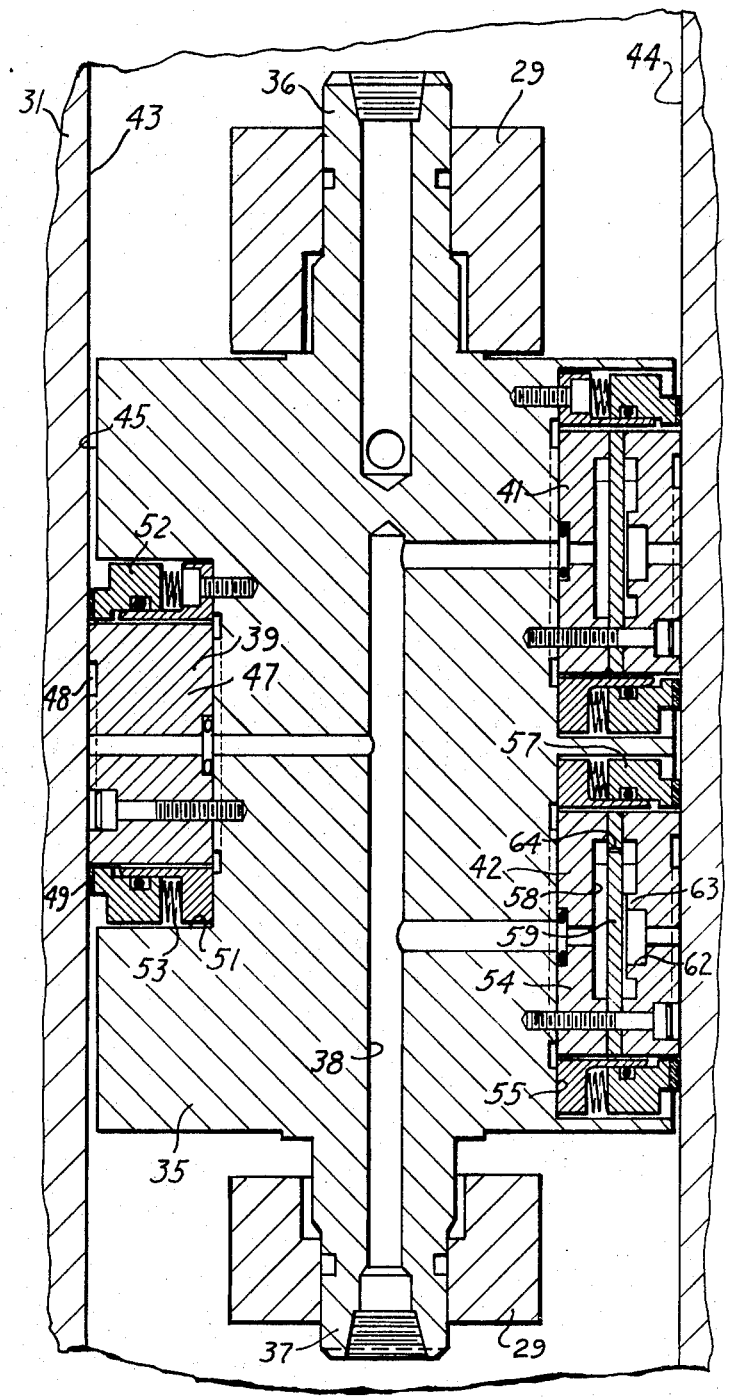
FIG. 6
FIG. 5

MACHINE TOOL

BACKGROUND OF THE INVENTION

In the design of machine tools, the major problem that is encountered is that, no matter how rigidly the components are constructed, they, nevertheless, "give" when a force is applied against them. This deflection is particularly noticeable in the case of bearings, where it is, of course, necessary to retain lubricant between the opposed surfaces. The increased use of the hydrostatic bearing in machine design has assisted to overcome this problem to a certain extent. The problem still remains, however, that in a machine tool construction, where a bearing must operate under loads of varying magnitude, the construction of more rigid elements and of use of higher bearing lubricant pressure reaches a point of diminishing returns. Large amounts of additional costs in the construction result in smaller and smaller ability to resist deflection. These and other difficulties experienced with the prior art devices have been obviated in a novel manner by the present invention.

It is, therefore, an outstanding object of the invention to provide a machine tool constructed in such a way as to offer extreme rigidity at relatively low cost.

Another object of this invention is the provision of a machine tool having a bearing which resists applied force by pushing back with an even greater force.

A further object of the present invention is the provision of a machine tool bearing construction offering extreme resistance to variations in the magnitude of applied force.

With these and other objects in view, as will be apparent to those skilled in the art, the invention resides in the combination of parts set forth in the specification and covered by the claims appended hereto.

SUMMARY OF THE INVENTION

In general, the invention consists of a machine tool, having a toolhead mounted on a table which has deflectable elements and a workhead mounted on a base which also includes deflectable elements. Means is provided, including hydrostatic bearing for connecting the table and the base for relative sliding movement therebetween. The toolhead, the table with its deflectable elements, the workhead, and the base with its deflectable elements form a force loop within which is distributed the working force due to the engagement between a tool carried in the toolhead and a workpiece carried in the workhead. The hydrostatic bearing includes means to cause it to act as a negative spring, so that positive force increments bring about reduced increments of deflection.

More specifically, the negative spring constant of the bearing is selected so that, when additional force is applied, the sum of the additional deflections of the deflectable elements in the force loop, due to that additional force, are compensated for by an increase in deflection in opposite direction in the bearing.

BRIEF DESCRIPTION OF THE DRAWINGS

The character of the invention, however, may be best understood by reference to one of its structural forms, as illustrated by the accompanying drawings, in which:

FIG. 5 is a sectional view taken on the line V—V of FIG. 4,

FIG. 6 is a view of a portion of the invention taken on the line VI—VI of FIG. 5.

DESCRIPTION OF THE PREFERRED EMBODIMENT

Figure 1:
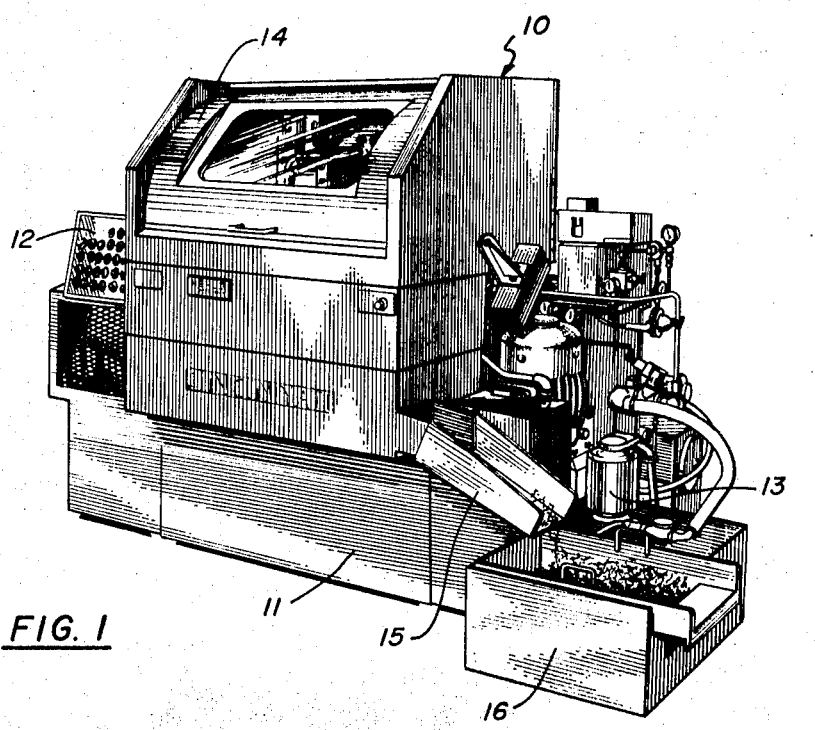
FIG. 1 is a perspective view of a machine tool embodying the principles of the present invention.

Referring first to FIG. 1, wherein are best shown the general features of the invention, the machine tool, indicated generally by the reference numeral 10, is shown as a vertical boring machine of the type shown and described in the U.S. Pat. of Jacobsen, No. 3,635,109 which issued on Jan. 18, 1972. As such, it is provided with a base 11, a control 12, a source 13 of pressure hydraulic fluid, and a protective cover 14, having a window 15 through which the machining operation can be observed. A chute 15 carries chips from the interior of the machine tool into a tote box 16 where they are collected.

Figures 2, 3:
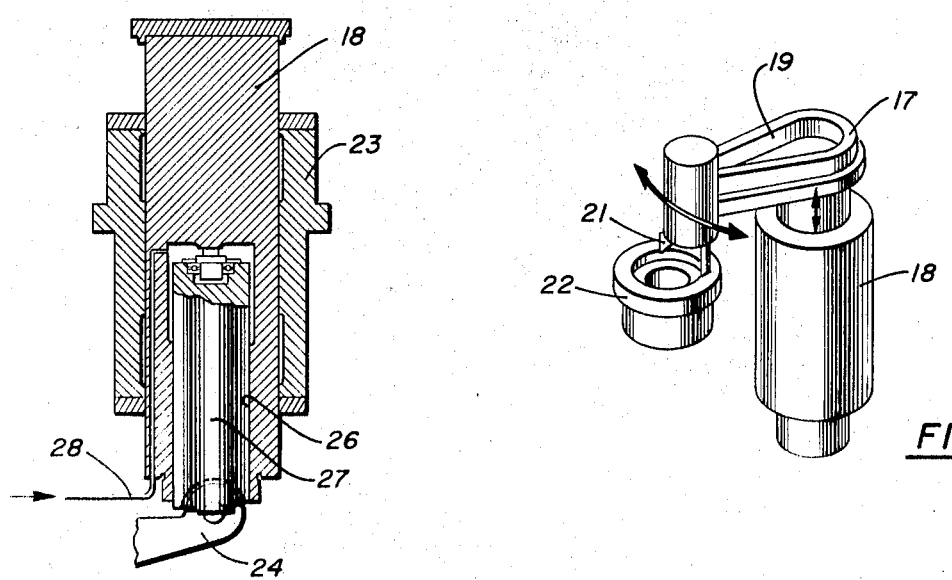
FIG. 2 is a perspective view of certain portions of the machine tool.
FIG. 3 is a sectional view of the invention taken on the line III—III of FIG. 4.

In FIG. 2 it can be seen that the machine tool is provided with a toolhead 17, having a vertical cylindrical post 18 from which extends a radial arm 19, on the outer end of which is mounted a tool 21. A tool is shown operating on a workpiece 22 which is mounted on a workhead, not shown, but which is mounted in the base 11 and rotated in order to rotate the workpiece about a vertical axis. This axis is the axis of a surface of revolution which is to be generated by the tool.

Figure 4:
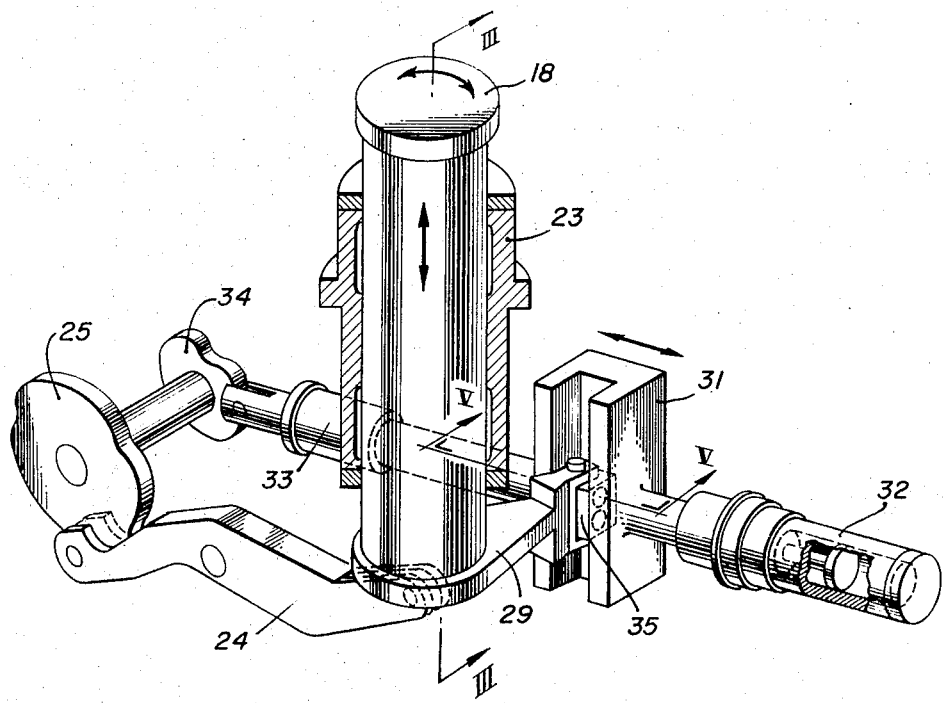
FIG. 4 is a perspective view of a portion of the machine.

In FIGS. 3 and 4 it can be seen that the post 18 is carried in a hydrostatic bearing sleeve 23, mounted in the base 11 by means, not shown, but which is fully taught by the prior art. The post 18 is vertically moveable under the impetus of a lever arm 24 which is operated by the rotation of a cam 25. The post 18, incidentally, is in two parts: an upper part having a bore 26 at its lower end and a piston 27 located in that bore. The post 18 can have its length extended, therefore, by the introduction of fluid into the bore 26 behind the piston 27 through a passage 28. Fastened to the bottom of the post is a crank arm 29 whose outer end resides in a guide 31. This guide can be moved laterally by means of a cylinder 32 extending from one side, or an extensible connecting rod 33 extending from the other side. The free end of the connecting rod 33 is engaged by a second cam 34 which brings about turning movement of the post 18. Thus, the shape of the cams 34 and 35 determine the vertical, as well as the rotative motions of the post 18, particularly when supplemented by the motion of the piston 27 in the bore 26. Because the outer end of the arm 29 must move vertically within the guides 31 when the post 18 moves up and down and since its angularity relative to the guide 31 changes when the post 18 rotates, it is necessary to provide a compensation bearing means therebetween. For that purpose, a bearing block 35 is pivotally mounted in a forked end of the arm 29 for rotation about a vertical axis.

Referring to FIGS. 5 and 6 it can be seen that the bearing block 35 is provided at its upper and lower end with stub shafts 36 and 37, respectively, for use in mounting it in the forked end of the arm 29. Entering the center of the post 37 is an oil passage 38 which is connected by means, not shown, to the source 13 of oil pressure shown in FIG. 1. The passage 38 leads to three hydrostatic bearings 39, 41, and 42 which provide for sliding between the surfaces of the guide 31 on the one hand and the arm 29 on the other hand. The guide 31 has two opposed plane parallel surfaces 43 and 44. The bearing 39 is mounted in a portion of the block 35 having a plane surface 45 which lies close to and facing the surface 43 of the guide. The bearings 41 and 42 on the other hand, are mounted in the portion of the block 35 having a surface 46 lying close to and facing the surface 44 of the guide 31.

Generally speaking, the bearing 39 is a more-or-less conventional hydrostatic bearing, similar to that shown in the patent of Youden No. 3,603,652 which issued on Sept. 7, 1971. It has a block 47 mounted in a recess formed in the block 35 and opening on the surface 45. The block 47 has a central hydrostatic pocket 48 facing the surface 43. Hydrostatic oil is supplied to the pocket through the passage 38. The pocket 48 is provided with a circular periphery which is surrounded by a plane surface land 49. Surrounding the periphery of the pocket and floating in the recess 51 is an annular seal element 52, having a flat outer surface adapted to engage the surface 43, a wave-type annular spring 53 is located in the recess 51 and presses the seal element outwardly to reduce the loss of fluid leaving the bearing. The fluid collected is returned to the source.

The hydrostatic bearing 42, however, is provided with a built-in valve element. The bearing has a block 54 carried in a recess 55 and is provided with a pocket 56 surrounded by a seal element 57. The block 44 is provided with an interior chamber 58 which is divided into two parts by a diaphragm 59. A portion of the chamber 58 away from the pocket 56 is connected directly to the high pressure passage 38. The other side of the chamber is connected by a passage 61 leading to the pocket 56. The inner end of the passage 61 (adjacent the chamber) is provided with a counterbore 62, surrounded by a flange 63 having a flat end facing the diaphragm 59. The diaphragm is provided with a small aperture 64 close to its periphery and outside the projection of the flange 63 onto the surface of the diaphragm. This aperture is the only communication from one side to the other of the chamber 58.

The hydrostatic bearing 41 is constructed in a manner similar to the bearing 42. The two bearings 41 and 42, which are valve and diaphragm controlled, are on the side of the block 35 which tends to be pressed against the surface 44 when cutting forces take place between the tool 21 and the workpiece 22. In other words, the cutting forces in the machine tool which tend to stretch and deflect the parts, act to rotate the post 18 and the arm 29 to press the bearings 41 and 42 against the surface 44.

The operation of the machine tool 10 will now be readily understood in view of the above discussion. In general, workpieces 22 are placed successively on the workhead connected to the base 11 and are rotated. The tool 21 is moved in and out of operational contact with the workpiece by the rotation of the cams 25 and 34. These cams are motor driven and cause the post 18 to move up and down in the sleeve 23 and also to rotate in that sleeve. The tools are moved radially by rotation of the post 18 and, for that reason, substantial forces are brought to bear between the bearing block 35 and the guide 31. The prior art machine tool forces of this type would cause extreme deflections in the various elements. For instance, the arm 19 associated with the toolhead 17, would deflect, there would be twisting in the post 18, there would be bending in the arm 29, and deflection in the bearings between the arm 29 and the guide 31, which in turn, is connected to the base 11. The workhead carrying the workpiece 22 and its connection to the base 11 would also be deflected. These deflectable elements form a force-loop wherein the forces originating in the contact between the tool 21 and the workpiece 22, cause various deflections around the loop and introduce various kinds of inaccuracies into the machining operation. In the present invention, the bearings 41 and 42 serve to introduce into the loop a negative spring constant, which negative spring constant is adequate to overcome the positive spring constants or deflections which take place in other parts of the machine due to the cutting forces.

Figure 7:
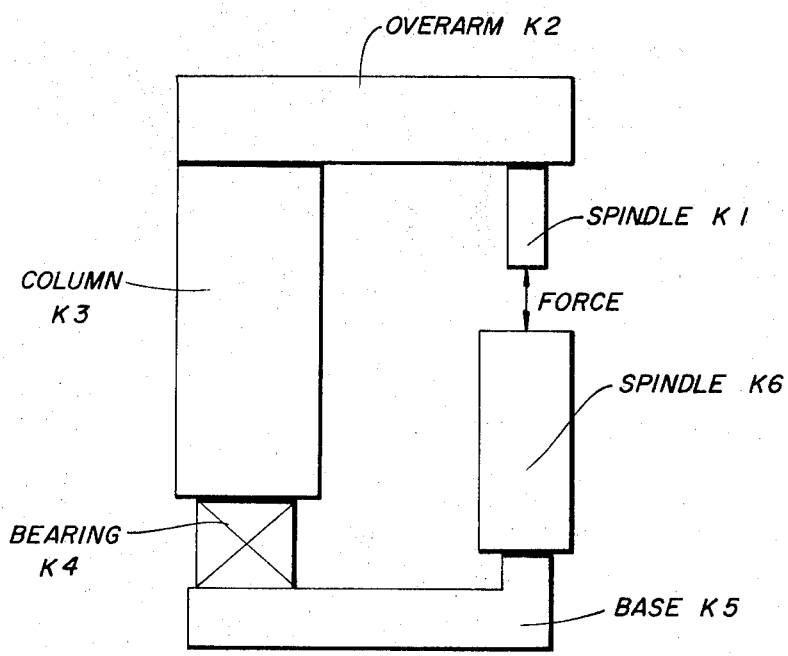
FIG. 7 is a schematic diagram of the machine tool.

Referring to FIGS. 5 and 6, it can be seen that, when an additional increment of force is added to the system, the block 35 and the bearings 41 and 42 start to move toward the surface 44. This results in the sensing by the diaphragm 59 of the rise in back pressure. Now, the position of the diaphragm 59 in the chamber 58 is determined by the differential pressure between the passage 61 leading to the hydrostatic pocket 56 on the one hand, and the pressure fluid appearing in the system in the passage 38. When the pressure in the pocket 56 increases, it is felt through the passages 61 in the counter bore 62 against the diaphragm 59 and this pushes the diaphragm away from the flange 63. The resulting increase in the space between the flange 63 and the diaphragm 59 causes a greater flow of fluid from one side of the chamber 58 to the other and into the pocket 56, which compensates for the slight movement and causes a greater flow of hydraulic fluid from the pocket 56 over the land surrounding it. This increases the gap between the surface 44 and the land surrounding the pocket 56. The exact same procedure, of course, takes place in connection with the bearing 41. Now, the diaphragm 59 is selected to have a very soft or low spring constant, so it is easily moved away from the flange 63 by any differential pressure. As a matter of fact, it moves so readily that it overcompensates for the slight movement produced and causes the bearing to push very strongly in the opposite direction. The result is that the greater the force between the bearings 41 and 42 and the surface 44, the greater the gap produced. It causes the reaction between the arm 29 and the guide 31 to act as though it had a "negative" spring constant, i.e., the greater the force the less the deflection. This combines with the "positive" spring deflections in the other elements of the machine tool to exactly counteract the forces produced, so that an increment of increase in force between the tool 21 and the workpiece 22 causes everything in the machine to deflect positively except the arm 27 and the guide 31 which deflect negatively, so that the total deflection in the force loop is zero. The theory by which this takes place can be more readily understood in connection with a somewhat different machine tool, as shown in FIG. 7, in which the spring constants of the various elements are indicated by $K_1$, $K_2$, etc. Now, occasionally a machine tool must be designed in such a way that the relative stiffness measured between the cutting tool and the workpiece is not large enough to allow the machine to make the necessary cuts without chatter. In such cases it is possible in accordance with the present invention to design a hydrostatic bearing in such a way as to cause the fluid film to appear to have a "negative" stiffness. When a bearing with this characteristic is introduced into the force-loop of the machine in question, it will have the effect of increasing the stiffness of the machine tool, thus allowing the machine to make heavier cuts than would otherwise be possible. The illustration in FIG. 7 represents a machine tool with a force exerted between an upper tool spindle and a lower workpiece spindle. The force is represented as a vertical separating force and a total stiffness of the machine around the force-loop, as measured between the quill in the spindle, can be expressed as:

$$K_{machine} = 1/1/K_1 + 1/K_2 + 1/K_3 + 1/K_4 + 1/K_5 + 1/K_6$$

where the $K_1$, $K_2$, $K_3$, $K_5$, and $K_6$ represent the spring constants of the various parts of the machine and $K_4$ represents the stiffness of the bearing. It can be seen that, if the algebraic sign of $K_4$ is reversed, the denominator of the fraction will become smaller, thus causing an increase in the $K_{machine}$. In fact, changing the sign of $K_4$ is more effective even than causing $K_4$ to become infinitely large. Therefore, if $K_4$ has a negative stiffness, the machine will be stiffer than it would be even if $K_4$ did not exist at all.

It can be seen, then, that by the use of this concept it is possible to provide a very rigid machine with much less massive elements than previously known.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   a. a toolhead,
   b. a table including deflectable elements for holding the toolhead,
   c. a workhead,
   d. a base including deflectable elements for holding the workhead,
   e. means including a hydrostatic bearing for connecting the table and the base for relative sliding motion therebetween, the toolhead, the table with its deflectable elements, the workhead, and the base with its deflectable elements forming a force loop within which is distributed the working force due to the engagement between a tool carried in the toolhead and a workpiece carried in the workhead, the hydrostatic bearing including means to cause it to act as a negative spring so that positive force increments bring about reduced increments of deflection.

2. A machine tool as recited in claim 1, wherein the relationship of the total spring constant, $K_{machine}$, to the individual spring constants $K_1$, $K_2$, etc. in the force loop is as follows:

$$K_{machine} = 1/1/K_1 + 1/K_2 + 1/K_3 - 1/K_4 + 1/K_5 + 1/K_6$$

where $K_4$ is the spring constant of the bearing.

3. A machine tool as recited in claim 1, wherein the negative spring constant of the bearing is selected so that when additional force is applied, the sum of the additional deflections of the deflectable elements in the force loop due to the additional force are compensated by the increase in deflection in the opposite direction in the bearing.

4. A machine tool as recited in claim 1, wherein the said means includes:
   f. a first element having spaced, parallel, opposed plane surfaces,
   g. a second element movable in a direction parallel to the said surfaces of the first element, the second element having a plane surface facing and close to each of the said surfaces of the first element, the hydrostatic bearing lying between one of the plane surfaces of the second element and the facing plane surface of the first element, and
   h. means operative to control the flow of hydraulic fluid to the hydrostatic bearing so that, when a force is brought to bear on the machine tool that tends to move the elements relative to each other perpendicular to the planes, the flow of fluid in the bearing increases sufficiently not only to resist such movement, but also to compensate for the deflection of other parts of the machine tool.

5. A machine tool as recited in claim 4, wherein the said means includes a value with a diaphragm for controlling the flow of hydraulic fluid to the bearing, the diaphragm having a spring constant such that an increase in force between the first and second elements results in an increase in separation between the plane surfaces.

6. A machine tool as recited in claim 5, wherein the periphery of the diaphragm is fixed and the center flexes relative to an annular flange surrounding a passage to a pocket forming part of the bearing, there being an aperture through the diaphragm in the area between the said flange and the said periphery.

7. A machine tool as recited in claim 6, wherein the diaphragm extends across a chamber and divides the chamber into a first portion that is connected to a source of pressure fluid and a second portion that is connected by a passage to the hydrostatic bearing pocket.

8. A machine tool as recited in claim 4, wherein a hydrostatic bearing also resides between the other of the plane surfaces of the second element and its facing surface of the first element, this second-mentioned bearing being connected directly to a source of pressure fluid, while the first-mentioned bearing is connected through a control valve to the said source.

9. A machine tool as recited in claim 4, wherein each hydrostatic bearing has a pocket having a periphery in the form of a closed plane figure, and wherein is provided a seal element surrounding each pocket, each seal element having the general shape of the said periphery and capable of floating action in the direction perpendicular to the plane in which the pocket is formed.

10. A machine tool as recited in claim 9, wherein the seal element is slidable in a recess, and wherein a spring located in the bottom of the recess pushes the seal element outwardly toward contact with the corresponding surface of the first element.

* * * * *